Aug. 7, 1945.  F. NETTEL ET AL  2,380,989
COMBUSTION TURBO-ENGINE DRIVE
Filed April 9, 1941
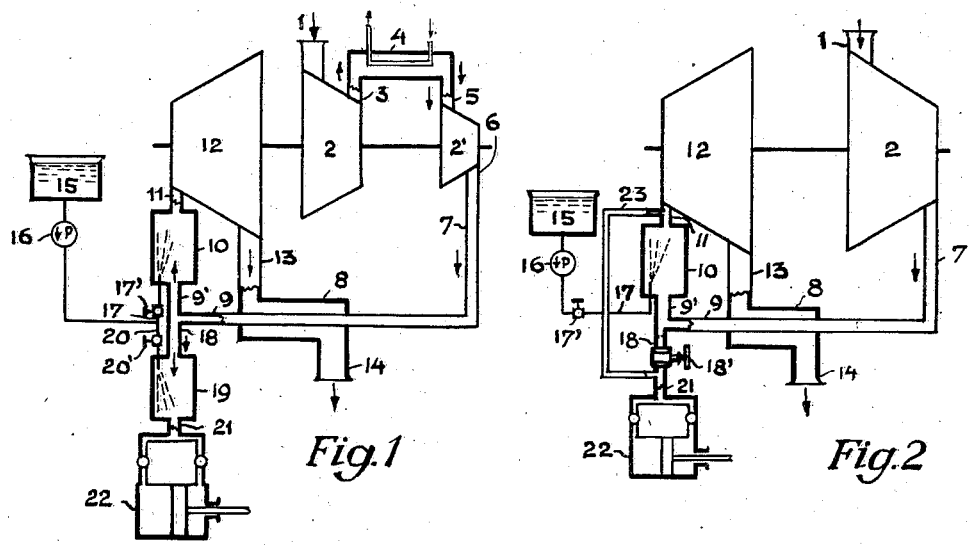
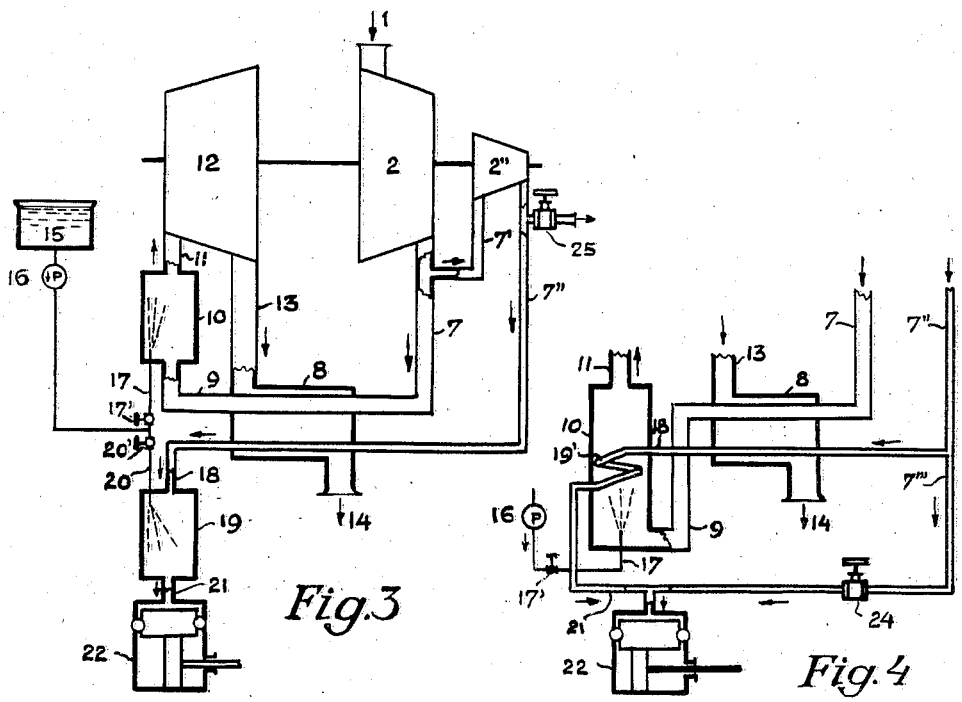
INVENTORS
Frederick Nettel.
Johannes Kreitner Patented Aug. 7, 1945

2,380,989

UNITED STATES PATENT OFFICE 2,380,989

COMBUSTION TURBOENGINE DRIVE

Frederick Nettel, Manhasset, and Johann Kreitner, Brooklyn, N. Y.; said Kreitner assignor to said Nettel Application April 9, 1941, Serial No. 387,629

2 Claims. (Cl. 60—49)

The present invention deals with a power system in which a gaseous working medium works partly in a combustion turbine and partly in a reciprocating engine.

It is known in the art to produce a compressed and heated gaseous working medium in a reciprocating engine set consisting of an internal combustion engine driving a reciprocating compressor. It is also known to let the internal combustion engine work at a backpressure equal to the end pressure of the compressor which it drives and to mix the exhaust gases from the engine with the compressed air which mixture is then used to produce useful power in either a reciprocating expansion machine or in a gas turbine.

These known arrangements have the disadvantage that many cylinders are necessary to produce the required quantity of working medium, making the whole plant very complex and therefore of low reliability and, besides, the weight and space required by the machinery are excessive for many purposes. It has proved particularly difficult to operate the reciprocating compressors at the necessarily limited temperatures and special measures like water injection into the compressor cylinders had to be resorted to, which complicates the operation further.

It is the broad object of this invention to improve the efficiency and performance characteristics of combustion power plants where operation under wide variations of load and/or rotative speed and torque is required, and/or where starting from standstill under heavy torque is desired.

All the abovementioned disadvantages are eliminated according to the present invention by using a combustion turbine-driven rotary compressor, working with gas temperatures at turbine inlet which are permissible and advantageous for such turbines, for supplying the compressed and if desired preheated gaseous working medium—mostly air—and by using a reciprocating expansion engine for the production of useful power, said engine working at other inlet temperatures which are permissible and advantageous for such reciprocating engines.

The permissible admission temperatures for reciprocating engines are generally lower than those of combustion turbines because of performance limitations of available lubricating oils for such engines. In combustion turbines the limit for admission temperature is set only by metallurgical considerations for the blade material used.

According to this invention the different admission temperatures are realized by provision of two separate combustion chambers for these two machines or by using one common combustion chamber and reducing the temperature of the air-gas mixture flowing to the reciprocating expansion engine by mixing it with cooler compressed air from the compressor.

It is thus evident that the advantages in efficiency and reliability gained by the invention result from the fact that extraordinarily favorable thermodynamical conditions are created for compression of the working medium, while the reciprocating expansion engine inherently works efficiently at any desired speed and partial load and moreover can be designed reversible under load which is of fundamental importance for marine, locomotive and other applications. Cooling water can be dispensed with altogether or the requirements reduced at will.

Fig. 1 represents a non-limiting example of the invention involving two compressors in series with intercooling and separate combustion chambers for turbine and expansion engine.

Fig. 2 shows another example with single compressor, common combustion chamber for turbine and expansion engine.

Fig. 3 shows an example adapted for operating the expansion engine at higher pressures than those utilized in the combustion turbine.

Fig. 4 indicates another embodiment of the invention with a single combustion chamber, adapted to operate the expansion engine with pure air.

Fig. 1 shows a non-limiting example of the practical execution of the invention in diagrammatic form. Working air is taken in from the atmosphere at 1 to the compressor 2, leaving it through pipe 3, entering the intercooler 4 which is supplied with a natural cooling medium like water or air, or artificial such as cold brine for example. The compressed cooled air leaves the intercooler through pipe 5 to enter the high-pressure compressor 2', leaving the latter at 6, flowing thereafter through pipe 7 to the heat exchanger 8, where it is preheated in a way described hereafter, thence through pipes 9 and 9' to the combustion chamber 10. In the latter a burner for liquid fuel is provided, supplied from fuel tank 15, fuel pump 16 and pipe 17 in which latter is arranged a fuel regulating valve 17'. In the combustion chamber fuel is burned in the compressed and preheated air discharged from pipe 9', thus heating the air further up to a predetermined temperature. The compressed hot air-gas mixture flows through pipe 11 to turbine 12 in which it expands, thus producing power for driving the compressors 2 and 2'. The air-gas mixture leaves the turbine through pipe 13 entering thereafter the heat exchanges 8 in which a portion of the heat content of the air-gas mixture is transferred to the compressed air discharged from compressor 2'. Finally the air-gas mixture is expelled to the ambient atmosphere through pipe 14. Another portion of the compressed air is branched off from pipe 9, flowing through pipe 18 to another combustion chamber 19 in which also a burner is provided supplied with liquid fuel through pipe 20 and regulating valve 20'. In combustion chamber 19 fuel is burned in the compressed and preheated air, heating it further up to another predetermined temperature. The resulting air-gas mixture discharges through pipe 21 into a reciprocating expansion engine 22, thus producing useful mechanical power for example for driving a ship propeller or a locomotive.

It is immaterial for the purposes of this invention what type of turbines, compressors, coolers or reciprocating expansion engines are used. It is also immaterial for this invention whether fuel is burned in the compressed air or whether fuel is burned in an air stream other than that of the working air and the heat of combustion transferred to the compressed working air partly or wholly through heating surfaces.

It is finally within the scope of the present invention to operate the combustion turbine and compressor at various speeds and pressures and to regulate the fuel quantities for the two combustion chambers in relation to the load and/or speed of the reciprocating expansion engine, so that the admission temperature at turbine inlet and engine inlet, respectively, remain substantially unchanged irrespective of changes in load and/or speed.

Fig. 2 shows an alternative arrangement with only one combustion chamber. In this case the air-gas mixture is produced in combustion chamber 10 and a portion of the mixture branched off from pipe 11 through pipe 23. This portion is mixed with preheated air branched off from pipe 9 through pipe 18 and regulated by valve 18'. Thus the temperature of the working medium flowing to the reciprocating engine 22 through pipe 21 is reduced to a value permissible, considering the requirements of lubricating such engine.

It is known in the art that the compression ratio for optimum efficiency of combustion turbine plants varies widely both with the temperature at inlet to the power generating machine and with the size of the heat exchanger employed.

According to the present invention optimum efficiency conditions are approached by using different pressures in the combustion turbine driving the compressor and in the reciprocating engine. The pressure in the latter may be chosen lower than that in the combustion turbine, but it may also be chosen higher, even though the thermal efficiency may be somewhat lowered thereby, if it is desired to reduce the size and weight of the reciprocating expansion machine.

The power system according to this invention offers particularly valuable features where starting with highest possible torque is required, such as is the case for example in locomotives, tractors, rolling mill drives and shaft winding engines etc. Before starting, the compressor set is kept running idling at low speed and consequently low pressure. A relief bypass may be kept open to the atmosphere in this condition, to prevent pumping of the compressor. During starting of the reciprocating expansion engine the speed of the turbo-compressor set is increased by increasing the quantity of fuel fed into its combustion chamber, and/or closing the relief bypass, thus increasing the useful torque greatly.

Equally favorable characteristics are encountered in operation; the underlying facts are explained in more detail as follows:

If the rotative speed of the reciprocating expansion engine is reduced, for example by an increase of the required torque, with all regulating devices remaining untouched, the engine consumes less air. This difference must be compensated partly by a decrease of the air quantity supplied by the compressor, and partly by an increase of the quantity flowing through the turbine. This raises the pressures built up by the compresosr, and thereby increases the useful torque of the reciprocating expansion engine. Thus the power system according to the present invention, as distinct from any other known thermal power system, shows the characteristics of a torque converter, i. e. the feature that the useful torque automatically increases if the useful power has to be furnished at reduced rotative speed. In order to be able to utilize the torque converter characteristics to the desirable high degree, the compressor design should be chosen in such a way that a small decrease in the air quantity delivered by the compressor at a certain speed causes the pressure to build up rather fast. While a displacement compressor has naturally such characteristic, also axial aerodynamical compressors can be made to reasonably fulfil this requirement without noticeable deleterious effect on efficiency.

Irrespective of the type of compressor, however, the features of automatic torque conversion are obtained through the favorable combination, according to this invention, of the characteristics of a reciprocating expansion engine supplying useful power, with the characteristics of a gas turbine for driving the compressor; namely, the reciprocating engine consuming less working medium when falling back in revolutions per minute, and the turbine automatically raising its admission pressure when that more working medium has to pass through the turbine.

Fig. 3 shows diagrammatically a non-limiting example of the power system according to the invention, working not only with different temperatures but also with different pressures at the inlets of the combustion turbine and reciprocating expansion engine respectively. The working air enters at 1, flows through low-pressure part-compressor 2 where its pressure is raised to, for example 4 atmospheres absolute. A portion of the air flows through pipe 7 to heat exchanger 8, leaves it preheated to a certain degree at 9 to enter combustion chamber 10 in which fuel, entering from tank 15, through pump 16 and regulating valve 17', is burned in the compressed and preheated air. The hot air-gas mixture thus formed enters turbine 12 through pipe 11, producing power in the turbine by expanding, being hereafter discharged through pipe 13 to the heat exchanger 8 and finally expelled to the atmosphere at 14. In heat exchanger 8 the compressed air entering through pipe 7 and leaving through 9 is preheated on its way to the combustion chamber 10. A second set of heating coils is indicated in Fig. 3 in the heat exchanger nearer to the entrance of the air-gas mixture from the turbine, the purpose of which will become clear hereafter. Another portion of the compressed air is branched off behind the low pressure stage compressor 2 through pipe 7', being compressed further in high pressure stage compressor 2" to say 7 atmospheres absolute, passing out through pipe 7" and through the beforementioned second set of heating coils in the heat exchanger 8, further through pipe 18 to the second combustion chamber 19. In the latter fuel, entering through pipe 20 and regulating valve 20', is also burned in that second portion of the compressed and preheated air, raising its temperature to a predetermined value permissible in reciprocating engines considering the necessity of cylinder lubrication, say to 400 deg. C. The hot air-gas mixture finally enters the reciprocating engine 22 of any type known in the art by pipe 21, producing useful mechanical work at any desired load and/or speed. The exhaust from the engine may be expelled to the atmosphere or be still further utilized in any desired manner before being thus expelled.

Valve 25, connected to pipe 7", permits to bypass adjustable air quantities to the atmosphere for purposes explained before.

A particularly advantageous arrangement is shown in Fig. 4, being a modification of example as per Fig. 3. Turbine and compressor, not shown, are the same as for Fig. 3. The modified arrangement employs a combination of direct internal combustion of fuel in the compressed and preheated air coming from compressor 2 through pipes 7 and 9 in combustion chamber 10, with indirect heating of the compressed and preheated air coming from compressor 2" through pipes 7" and 18 through a heating coil 19' arranged inside combustion chamber 10 which latter thus acts as furnace for the air flowing through said heating coil 19' on its way to the reciprocating expansion engine. In order to be able to regulate the temperature of the air at the inlet to the reciprocating expansion engine, an air pipe 7'" is branched off from pipe 7" providing a connection with pipe 21 via a regulating valve 24. By adjusting the latter, more or less cooler air from pipe 7" is mixed with the hot air coming from the heating coil 19' so that the temperature of the air entering the reciprocating engine can be regulated at will or kept constant at any desired value. Since only pure hot air works in the reciprocating engine, impurities contained in the fuel used such as ash, asphalt or sulphur cannot damage the interior parts. The combustion turbine, on the other hand, due to absence of internal friction and lubrication, is far less sensitive to such impurities.

Where for the purposes of this invention separate heating devices are employed for the two parallel streams of working medium for the combustion turbine and the reciprocating expansion engines respectively it is within the scope of the invention to use different fuels in such heating devices which may be designed as combustion chambers for direct internal combustion and/or furnaces for heat transfer through heating surfaces.

The present invention thus discloses new methods and apparatus which secure as regards efficient load-, speed- and torque regulation all the advantages which heretofore were only obtainable in combustion power plants by employing either hydraulic or electric power transmission means, but without the complications and excessive weights involved by the latter and with unequalled simplicity and ease of operation.

Where quick stopping or reversing or braking is required, the expansion engine can be suitably designed to attain these objects, as known in the art.

We have described preferred embodiments of our invention, but it is clear that numerous changes, omissions or introductions of equivalents may be made without departing from the spirit of our invention. As combustion power systems in which the new methods may be carried out, all kinds of stationary power plants as well as plants on all kinds of vehicles for road, rail, water and air may be considered.

Having now fully described our invention, we claim:

1. In a power system including an air compressor, a combustion chamber, a gas turbine, and a reciprocating expansion engine, means for compressing air in two stages, means for branching off a portion of the air after the first compression stage, means for heating said branched off air stream in said combustion chamber and for admitting it into the gas turbine, means for heating, after compression through the second stage, the remaining portion of the air and for admitting it into the reciprocating expansion engine, coupling means for transmitting the power produced by said turbine to said compressor, and coupling means for transmitting the power produced by said reciprocating expansion engine to a power consumer.

2. In a power system including means for compressing air, means for heating said compressed air, a gas turbine, and a reciprocating expansion engine driven by the expansion of said compressed and heated air or gaseous medium, a combustion chamber for internal combustion of fuel in the compressed air stream flowing to the gas turbine, heating surfaces in said combustion chamber for transferring a portion of the fuel heat onto the compressed air stream flowing to the reciprocating expansion engine, coupling means for transmitting the power produced by said turbine to said compressing means, and coupling means for transmitting the power produced by said reciprocating expansion engine to a power consumer.

FREDERICK NETTEL.
JOHANN KREITNER.